Nov. 3, 1942.   E. FREYSTEDT   2,300,562
FUEL CONTAINER SOUNDING DEVICE
Filed May 8, 1940
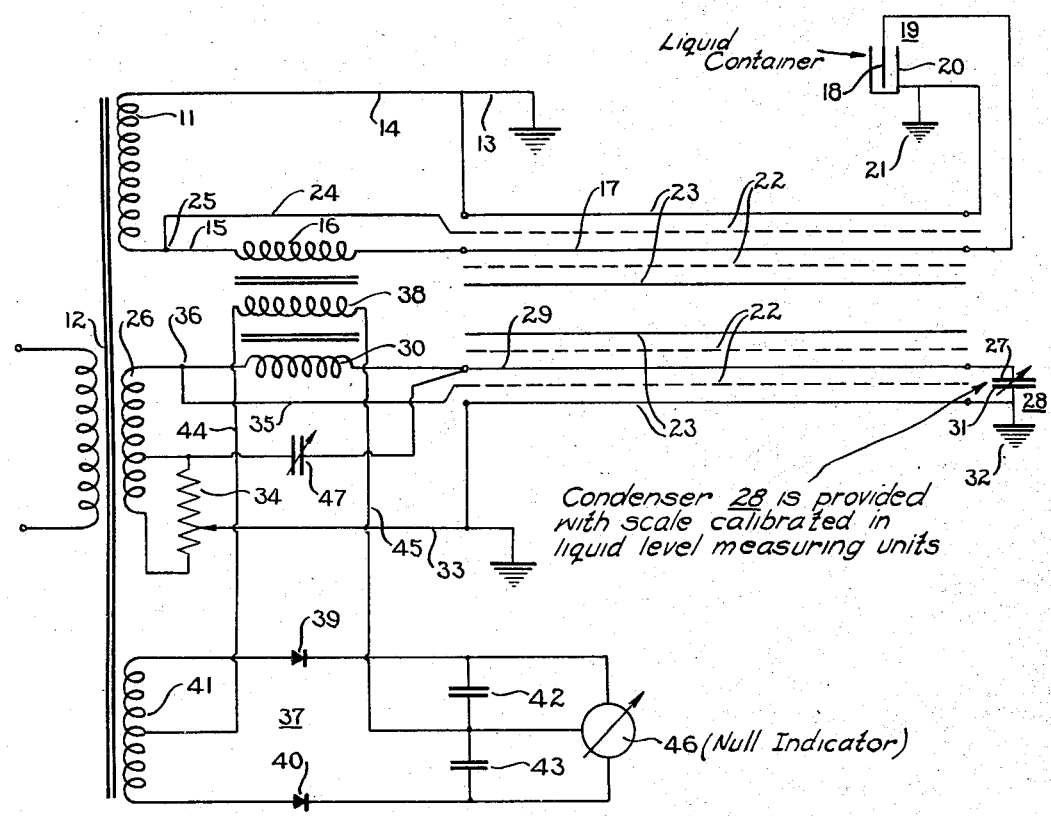
INVENTOR.
Erich Freystedt
BY Stephen Cerstvik
ATTORNEY.

Patented Nov. 3, 1942

2,300,562

UNITED STATES PATENT OFFICE 2,300,562

FUEL CONTAINER SOUNDING DEVICE

Erich Freystedt, Berlin-Siemensstadt, Germany; vested in the Alien Property Custodian Application May 8, 1940, Serial No. 334,088
In Germany March 30, 1939

1 Claim. (Cl. 73—304)

This invention relates to means for measuring capacitances, and more particularly to capacitance means for determining the volume of liquid in a container upon an unstable support.

Devices have heretofore been proposed for determining the volume of liquid within a container by means of the so-called "condenser method" in which a condenser is disposed in the liquid, the condenser comprising, for example, two elements; one of which is the container or tank proper, and the other a suitable condenser member mounted therein immersed in liquid in the container. Such volume determining means are particularly useful for determining the quantity of fuel in tanks mounted aboard vehicles such as aircraft, the attitudes of which change rapidly and often.

The above mentioned sounding device in which the tank proper comprises one of the condenser elements is sometimes referred to as a "Unilaterally grounded sounding apparatus." This device is normally constituted by a measuring bridge having a measuring arm in which the unknown capacitance is operatively connected, and a comparison arm having connected therein a comparison condenser of a conventional variety. Aboard aircraft it is often necessary that the unknown capacitance to be measured in the fuel tank be situated at a point remote from the measuring bridge. This also is true concerning the comparison condenser in its relation to said bridge. Therefore, means must be provided when the comparison condenser and the capacitance to be measured are at a considerable distance from the measuring bridge to compensate for the distributed capacity produced by the electric leads which interconnect said members to the bridge. It has been heretofore proposed to use double screen cables in connection with said leads for the purpose of making the system independent of the "line capacity" or "lead capacitance" which can have quite a disturbing effect on the measurements of the bridge. Such double screen cables are constituted by an inside screen which is adjacent said lead and an outside screen which is external to the first mentioned screen. In the conventional double screen cable connected with the above bridge, the outside screen is grounded and the lead covered thereby is connected to the ungrounded element of the condenser, the capacitance of which is unknown, and the inside screen is directly electrically connected to the bridge proper. The inside screen will practically eliminate the disturbing capacitance between the inside lead and the outside screen. However, certain capacitances which are known as "partial capacitances" normally arise between the lead and the inside screen, and between the inside and outside screen. These partial capacitances in the above described circuit are parallel to the current source or to the output portion of the measuring bridge and therefore do not seriously influence the zero balancing of said bridge. However, the sensitivity of the apparatus is reduced by the fact that the smaller of the partial capacitances, i. e., that between the inside lead and inside screen, is parallel to the output of the bridge.

One of the objects of the present invention is to provide a novel capacitance sounding device which is extremely sensitive.

Another object of the invention is to provide a novel capacitance sounding device, the accuracy of which is not affected by line capacitances.

A further object is to provide a novel apparatus of the above character which can be electrically adjusted to different liquids having different dielectric constants.

The above and further objects and novel features will more fully appear from the detailed description when the same is read in connection with the accompanying drawing. It is to be expressly understood, however, that the drawing is for the purpose of illustration only and is not intended as a definition of the limits of the invention, reference for this latter purpose being had to the appended claim.

The form of the invention illustrated in the drawing, by way of example, comprises a novel measuring bridge for measuring the capacitance of a condenser formed by a container and a suitable condenser element, the container having a liquid therein, the capacitance of the condenser being a function of the volume of liquid. The measuring bridge is constituted by a first or measuring arm which is operatively associated with the unknown capacitance and a second arm having therein a comparison condenser. Suitable double screen cables are provided for covering the electrical leads which interconnect the condenser having the unknown capacitance to the first arm and for connecting the comparison condenser to the comparison arm. In order to avoid disturbing line capacitances, the measuring arm and comparison arm are electrically separate with the exception of an inductive coupling. Operatively associated with said arms is a suitable rectifier bridge having a suitable indicator connected therein for indicating the condition of electrical balance between said arms.

Means are provided in the comparison arm for adjusting the maximum and minimum indications of said indicator.

In the drawing, the novel measuring bridge is constituted by a measuring arm having a feed coil 11 which is inductively connected to a primary feed coil 12. One extremity of the coil is connected to ground at 13 by a lead 14. The opposite extremity of said coil is connected by lead 15 to output coil 16, which comprises one portion of an inductive coupling to appear hereinafter. Coil 16 is connected by suitable lead 17 to one element 18 of a condenser 19, the capacitance of which is to be measured. A second element 20 of the condenser is grounded at 21. One of the condenser elements, preferably 20, comprises, for example, a fuel container which is shown in the single figure at a greatly reduced scale. For a reason above mentioned, a double screen cable or covering is provided for the conductor or lead 17, comprising an inner screen 22 and an outer screen 23. The latter is directly electrically connected to lead 14 and to the grounded element 20 of the condenser. The inner screen 22 is electrically connected by means of lead 24 to a point 25 intermediate the coils 16 and 11.

The comparison arm of the measuring bridge is constituted by a coil 26 which is similar to coil 11 and comprises a secondary coil relative to the above mentioned input coil 12. One extremity of coil 26 is connected to one element 27 of a comparison condenser 28 by means of a lead 29 having connected therein an output coil 30 which cooperates with coil 16 to form an inductive coupling. The condenser 28 is of a conventional variable variety and includes an adjustable element 31 which cooperates with element 27. The member 31 is grounded at 32. A double screen cable which is similar to that above described surrounds lead 29 and is analogously connected, i. e., outer screen 23 is grounded by a connection to a lead 33, which, in a manner to appear later, is connected at one extremity to the ground, and at the other to coil 26 through a potentiometer 34, the purpose for which will also appear hereafter. The inner screen 22 is connected by lead 35 to a point 36 which is similar in its position to that of point 25.

The above described measuring arm and comparison arm are electrically separated with the exception of the inductive coupling formed by coils 16 and 30. They can be considered to be "galvanically separated," i. e., the circuits comprising the two arms are not in a direct electrical connection in such a manner that current from one can flow directly to the other. In the above circuits, the partial capacitances which tend to reduce the sensitivity of the device are in parallel to the outputs of the measuring and comparison arms.

Suitable means are provided for determining the electrical balance between the above mentioned arms comprising a rectifier bridge 37 which is inductively coupled to the outputs of the bridge arms, that is, coupled to the coils 16 and 30 by means of a coil 38. It is the purpose of the rectifier bridge to bring about a most sensitive indication, and above all an indication which is correct relative to the phases of the currents flowing within the bridge. The rectifier bridge is of the capacity type and is constituted by rectifiers 39 and 40, which are respectively connected to opposite extremities of an input coil 41 which is inductively linked with coil 12. Condensers 42 and 43 which are in series with rectifiers 39 and 40 are connected across coil 41. Coil 38 is connected to the rectifier bridge by means of leads 44 and 45, which are respectively connected preferably to the mid-point of coil 41 and to a point intermediate to the condensers 42 and 43. A null type indicating instrument 46 which gives a visible indication of the balanced condition of the bridge or when electrical disturbances are occurring in the bridge arm inductive coupling is in differential connection with said condensers 42, 43. Two circuits, therefore, exist in this rectifier bridge, in one of which there is active the sum of, and in the other the difference between the voltage in the above mentioned inductive coupling and an auxiliary voltage which is taken from coil 41.

There is preferably mounted upon the variable condenser 28 a dial (not shown) which is movable with the adjustable element of said condenser and upon which is calibrated, for example, a scale for the measurement of the volume of liquid in the container comprising part of a condenser 19.

In the comparison arm of the measuring bridge are connected suitable means for establishing the zero point of the condenser 28 and for adjusting the maximum deflection point or range of the instrument 46 which, as previously stated, is a null type indicator showing when the bridge is balanced. These means also permit in a very simple manner and without change of the calibration of the dial employed with condenser 28, an adjustment of the apparatus for any desired types of fuel, said types having varying dielectric constants. For the adjustment of the zero point, there is employed a variable condenser 47 which is connected effectively in parallel with the comparison condenser 28. For example, it is connected between the lead 29 and the potentiometer 34. In order to adjust the maximum deflection of the null indicator 46 when measuring fuels or other liquids having different dielectric constants, there is employed suitable means for changing the feed or supply of voltage to the comparison arm comprising said potentiometer 34. The latter is connected in parallel with a portion of the secondary coil 26. Consequently, both the zero point and the maximum deflection point of the null indicator 46 can be adjusted independently of one another. By varying the resistance of potentiometer 34, the scale or calibration of the condenser 28 remaining the same, it is possible to accommodate the apparatus to fuels having many different dielectric values, as above mentioned, and it is also possible to correct electrical irregularities in this device which may be caused by failure to meet manufacturing tolerances.

In operation, in the event that the capacitance of condenser 19 does not coincide with that of the condenser 28, a differential voltage will occur in the measuring bridge, which will cause the null indicating instrument 46 to deflect. The comparison condenser 28 is then adjusted, for example, by means of a manually operable knob until the deflection of the null indicator is again zero. The adjustment of the condenser 28 is then read from the dial employed therewith which will give an indication of the volume of liquid within the container comprising part of the condenser 19.

There is thus provided novel means for determining the amount of fuel within a tank or container. The novel means include a capacitance measuring bridge having the measuring and comparison arms thereof separated in such a manner that the capacitances, which normally reduce the sensitivity and accuracy of such an apparatus, are reduced to a minimum. The partial capacitances between the inside and outside screens of the double screen cables are connected in parallel to the current source, and the partial capacitances between the condenser leads, and the inside screens are connected in parallel to the outputs of the bridge arms, with the result that the sensitivity of the measuring bridge is influenced very little or practically not at all thereby.

Although only one embodiment of the present invention has been illustrated and described in detail, it is to be expressly understood that the same is not limited thereto. For example, the potentiometer 34 can be connected at any one of various taps or terminals of the winding 26, it thereby being possible to obtain both a rough and fine control of the feed voltage of the comparison arm. Various changes in the design and arrangement of the parts can be made without departing from the spirit and scope of the invention as the same will now be understood by those skilled in the art. For a definition of the limits of the invention, reference will be had primarily to the appended claim.

What is claimed is:

In apparatus of the class described, a container having a liquid therein the level of which is to be determined, an element cooperating with said container to form a variable condenser the capacity of which varies with the liquid level, a capacity measuring bridge having a measuring arm to which said container and element are electrically connected and a comparison arm including a variable condenser adapted to be adjusted so that its capacity will be equal to that of the condenser formed by said container and element to indicate the amount of liquid in said container, said measuring arm and said comparison arm being inductively coupled to each other, a rectifier bridge inductively coupled to said measuring and comparison arms and including a null indicator for indicating when said measuring bridge is in a null or balanced condition at which time the capacity of the condenser in the comparison arm is equal to that of the condenser formed by said container and element, means for adjusting said measuring bridge for measurement of liquids having different dielectric constants, and means for adjusting said measuring bridge to an initially balanced condition to establish the zero point of the condenser of said comparison arm.

ERICH FREYSTEDT.